(12) United States Patent
Bradfield

(10) Patent No.: US 11,811,294 B2
(45) Date of Patent: Nov. 7, 2023

(54) INTEGRATED STATOR COOLING JACKET SYSTEM

(71) Applicant: BorgWarner Inc., Auburn Hills, MI (US)

(72) Inventor: Michael Duane Bradfield, Anderson, IN (US)

(73) Assignee: BORGWARNER INC., Auburn Hills, MI (US)

( * ) Notice: Subject to any disclaimer, the term of this patent is extended or adjusted under 35 U.S.C. 154(b) by 390 days.

(21) Appl. No.: 16/739,264

(22) Filed: Jan. 10, 2020

(65) Prior Publication Data
US 2020/0227977 A1 Jul. 16, 2020

Related U.S. Application Data

(60) Provisional application No. 62/793,215, filed on Jan. 16, 2019.

(51) Int. Cl.
*H02K 9/00* (2006.01)
*H02K 5/20* (2006.01)
(Continued)

(52) U.S. Cl.
CPC ............ *H02K 9/00* (2013.01); *H02K 5/203* (2021.01); *H02K 1/20* (2013.01); *H02K 9/19* (2013.01)

(58) Field of Classification Search
CPC .. H02K 9/19; H02K 5/20; H02K 3/24; H02K 9/193; H02K 5/203; H02K 5/207;
(Continued)

(56) References Cited

U.S. PATENT DOCUMENTS 4,330,726 A * 5/1982 Albright ............... H02K 55/04
174/DIG. 20
4,912,350 A 3/1990 Parshall et al.
(Continued)

FOREIGN PATENT DOCUMENTS

CN 111769674 A 10/2020
DE 102015215762 A1 * 2/2017
JP 2006033916 A * 2/2006

OTHER PUBLICATIONS

Arai (JP 2006033916 A) English Translation (Year: 2006).*
(Continued)

*Primary Examiner* — Tulsidas C Patel
*Assistant Examiner* — Robert E Mates
(74) *Attorney, Agent, or Firm* — CANTOR COLBURN LLP

(57) ABSTRACT

An electric machine includes a stator formed from a plurality of stator laminations arranged in a first lamination group and a second lamination group that is circumferentially off-set from the first lamination group. The first lamination group and the second lamination group forming a tortuous flow path that extends axially across the stator. Each of the plurality of stator laminations of the first lamination group includes a body having an inner surface section and an outer surface section. The inner surface section includes a plurality of stator teeth. A plurality of cooling channel defining members is integrally formed with and extend radially outwardly from the outer surface section. Each of the plurality of cooling channel defining members being spaced from others of the plurality of cooling channel defining members by a corresponding gap.

16 Claims, 4 Drawing Sheets

(51) Int. Cl.
*H02K 9/19* (2006.01)
*H02K 1/20* (2006.01)

(58) Field of Classification Search
CPC ............ H02K 9/197; H02K 1/32; H02K 9/00;
H02K 9/14; H02K 1/20
USPC .... 310/216.008, 216.009, 216.011, 216.013,
310/216.014, 216.015, 216.016
See application file for complete search history.

(56) References Cited

U.S. PATENT DOCUMENTS

| | | | |
|---|---|---|---|
| 5,331,238 A * | 7/1994 | Johnsen | H02K 5/20 310/58 |
| 8,201,316 B2 | 6/2012 | Rippel et al. | |
| 2007/0013241 A1 | 1/2007 | Schiferl et al. | |
| 2008/0100159 A1* | 5/2008 | Dawsey | H02K 1/20 310/59 |
| 2014/0070640 A1 | 3/2014 | Tolpadi et al. | |
| 2015/0076935 A1 | 3/2015 | Bulatow et al. | |
| 2016/0149450 A1 | 5/2016 | Horii et al. | |
| 2016/0372983 A1 | 12/2016 | Okochi | |
| 2021/0367461 A1 | 11/2021 | Barti et al. | |

OTHER PUBLICATIONS

Charles (DE 102015215762 A1) English Translation (Year: 2017).*
International Search Report and Written Opinion for International Application No. PCT/US2020/013073; International Filing Date Jan. 10, 2020; Report dated May 8, 2020 (pp. 1-8).

\* cited by examiner

INTEGRATED STATOR COOLING JACKET SYSTEM

CROSS REFERENCE TO RELATED APPLICATION

This application claims the benefit of an earlier filing date from U.S. Provisional Application Ser. No. 62/793,215 filed Jan. 16, 2019, the entire disclosure of which is incorporated herein by reference.

BACKGROUND OF THE INVENTION

Exemplary embodiments pertain to the art of electric motors and, more particularly, to an electric motor having an integrated stator cooling system.

During operation, electric motors produce heat. Often times, rotating components of an electric motor may support a fan member that directs a flow of air through internal motor components. The flow of air may help with smaller systems, such as alternators, and systems that are installed in open areas, such as generators. The flow of air is not always sufficient in high output systems, particularly those installed in closed areas, such as motor vehicle engine compartments.

Electric motors that are employed as prime movers in a motor vehicle typically include a liquid coolant system. The electric motor includes a stator formed from a plurality of stator laminations and a rotor. The liquid cooling system may include an inlet that receives coolant and an outlet that guides coolant to a heat exchange system. The coolant may flow in a jacket arranged radially outwardly of a stator of the electric motor. Specifically, the coolant may flow through small openings in the housing down onto end turns of a stator winding. The coolant runs over the end turns and passes to the outlet. Transferring heat from the end turns to the coolant reduces a portion of an overall heat signature of the electric motor. However, the end turns have a relatively small surface area relative to an overall size of the stator thereby limiting cooling efficiency.

Other systems rely on direct contact between an outer surface of the stator and an inner surface of a motor housing. In some cases, a cooling jacket may be defined at the inner surface of the housing. Heat may flow from the stator, through the housing, into the coolant passing through the cooling jacket. Indirect contact between a coolant and a surface to be cooled limits heat transfer capacity. In other systems, the heat may pass from an outer surface of the stator into coolant flowing through the housing. The outer surface of the stator possess a relatively small surface area when considered in relation to an overall area of the stator laminations. Accordingly, the industry would be receptive to electric motor cooling systems that remove heat from a larger surface area of the stator directly into a coolant to increase cooing efficacy.

BRIEF DESCRIPTION OF THE INVENTION

Disclosed is an electric machine including a housing having an outer surface, an inner surface, a coolant inlet, and a coolant outlet. A stator is mounted in the housing. The stator is formed from a plurality of stator laminations arranged in a first lamination group and a second lamination group that is circumferentially off-set from the first lamination group. The first lamination group and the second lamination group forming a tortuous flow path that extends axially across the stator. Each of the plurality of stator laminations of the first lamination group includes a body having an inner surface section and an outer surface section. The inner surface section includes a plurality of stator teeth. A plurality of cooling channel defining members is integrally formed with and extend radially outwardly from the outer surface section. Each of the plurality of cooling channel defining members being spaced from others of the plurality of cooling channel defining members by a corresponding gap.

Also disclosed is a stator lamination including a body having an inner surface section and an outer surface section, the inner surface section including a plurality of stator teeth. A plurality of cooling channel defining members is integrally formed with and extend radially outwardly from the outer surface section. Each of the plurality of cooling channel defining members is spaced from others of the plurality of cooling channel defining members by a corresponding gap.

BRIEF DESCRIPTION OF THE DRAWINGS

The following descriptions should not be considered limiting in any way. With reference to the accompanying drawings, like elements are numbered alike.

DETAILED DESCRIPTION OF THE INVENTION

A detailed description of one or more embodiments of the disclosed apparatus and method are presented herein by way of exemplification and not limitation with reference to the Figures.

Figure 1:
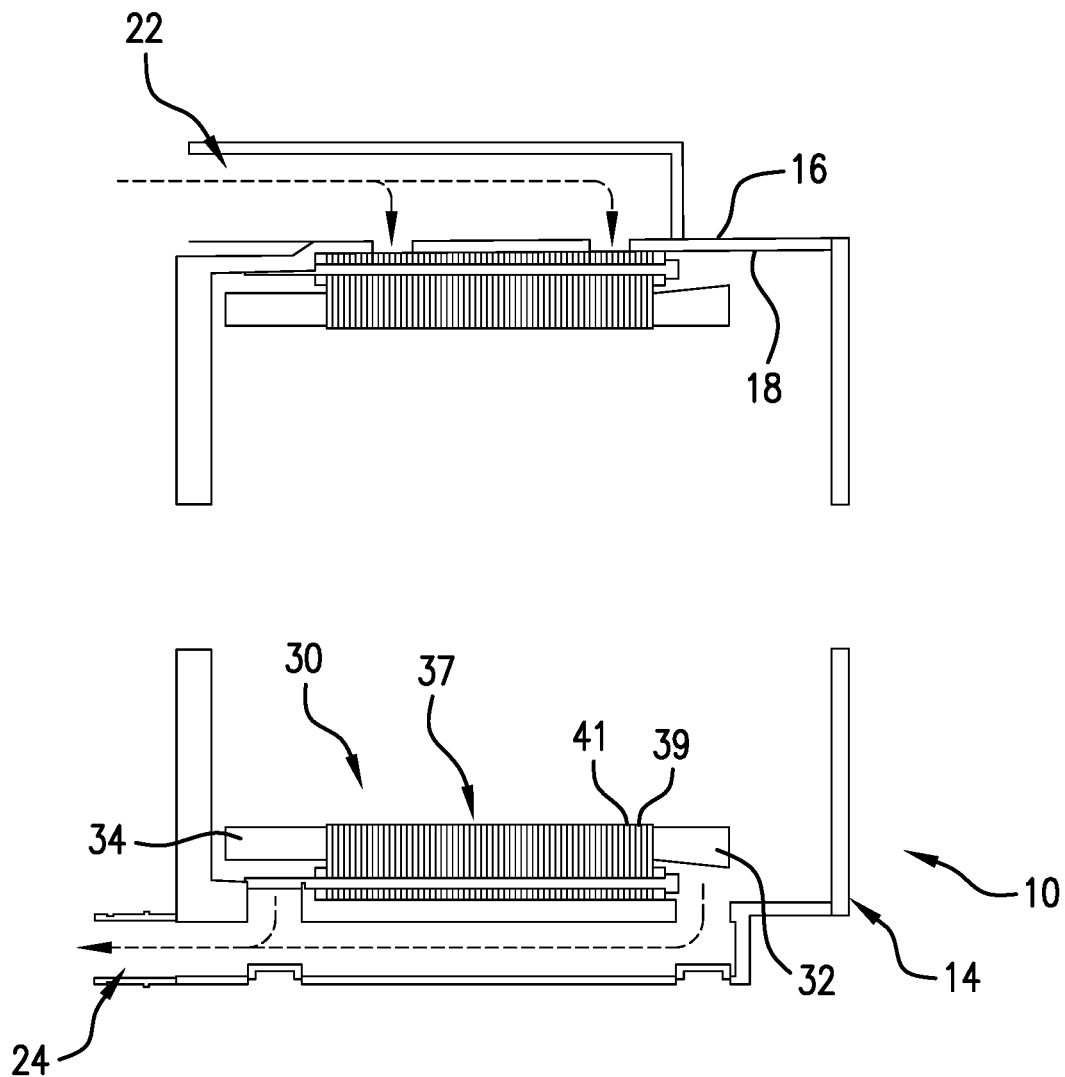
FIG. 1 depicts an electric motor including a stator formed from a plurality of stator laminations, in accordance with an aspect of an exemplary embodiment.

With initial reference to FIG. 1, an electric motor in accordance with an exemplary embodiment, is indicated generally at 10. Electric motor 10 includes a housing 14 having an outer surface 16 and an inner surface 18. Housing 14 also includes a coolant inlet 22 and a coolant outlet 24. The particular location and orientation of coolant inlet 22 and coolant outlet 24 may vary. Electric motor 10 includes a stator 30 arranged in housing 14. Stator 30 is coupled to an end wall (not separately labeled) of housing 14. Stator 30 includes a first end turn 32 and a second end turn 34.

Stator 30 is formed from a plurality of stator laminations 37 as will be detailed more fully herein. Stator laminations 37 are arranged in a plurality of lamination groups including a first lamination group 39 and a second lamination group 41. The number of lamination groups may vary. Second lamination group is radially off-set relative to first lamination group 39. In an embodiment, second lamination group 41 may be radially off-set from first lamination group 39 by about 30°.

Figure 2:
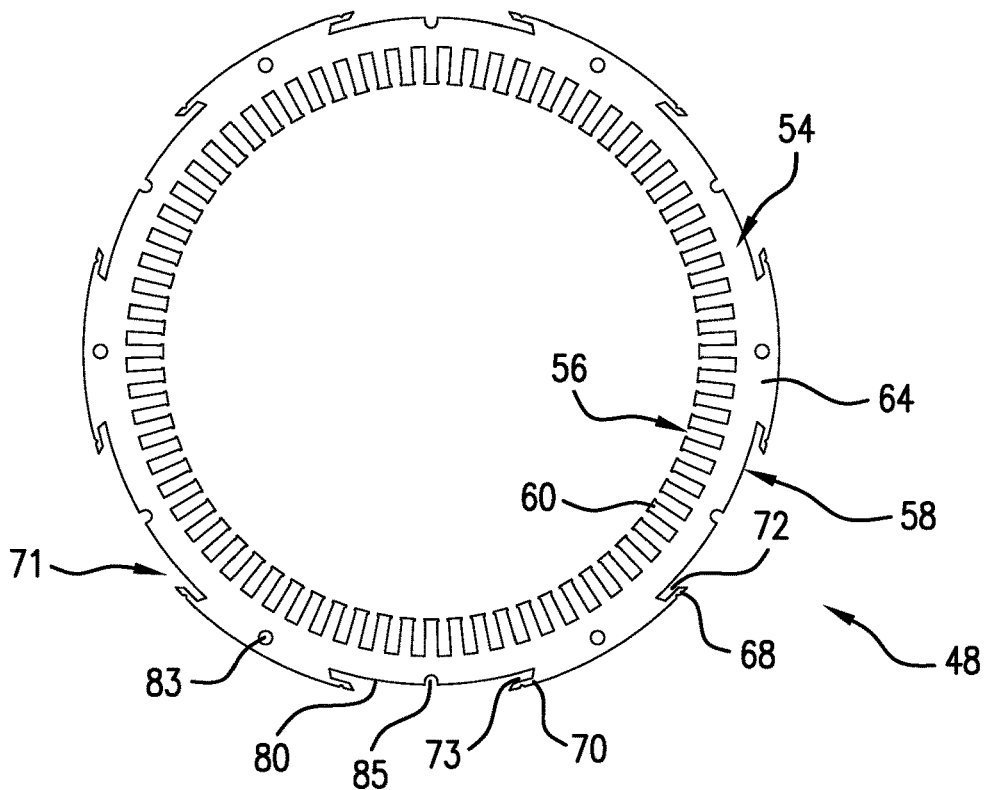
FIG. 2 depicts a stator lamination of the stator of FIG. 1.

Reference will now follow to FIG. 2 in describing a stator lamination 48 that may form part of first lamination group 39. Stator lamination 48 includes a body 54 having an inner surface section 56 and an outer surface section 58. Inner surface section 56 supports a plurality of radially inwardly projecting stator teeth 60. In accordance with an exemplary embodiment, outer surface section 58 supports a plurality of cooling channel defining members, one of which is indicated at 64.

In an embodiment, each cooling channel defining member 64 is radially off-set from an adjacent cooling channel defining member 64 by about 30°. It should be understood that the number of cooling channel defining members may vary as may the off-set between adjacent cooling channel defining members. Further, the offset may be different from or may be substantially the same as the off-set between adjacent lamination groups.

In accordance with an exemplary embodiment, each cooling channel defining member 64 includes a first circumferentially extending portion 68 and a second circumferentially extending portion 70. First circumferentially extending portion 68 is spaced from second circumferentially extending portion 70 by a gap 71. First circumferentially extending portion is also spaced from outer surface section 58 to establish a first cooling channel portion 72 and second circumferentially extending portion 70 is spaced from outer surface section 58 to establish a second cooling channel portion 73. A third cooling channel portion 80 extends between adjacent first circumferentially extending portion 68 and second circumferentially extending portion 70.

Figure 3:
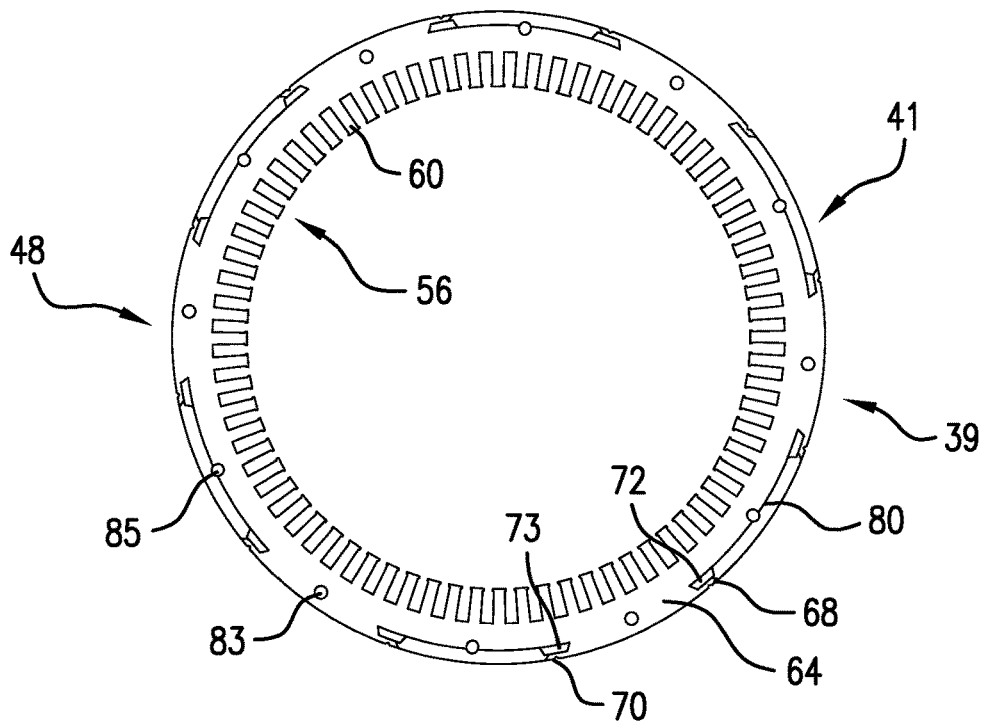
FIG. 3 depicts stator laminations arranged in a first lamination group radially off-set from stator laminations of a second lamination group, in accordance with an aspect of an exemplary embodiment.

Each stator lamination 48 includes an opening 83 formed in each of the plurality of cooling channel defining members 64 and a partial opening 85 formed in third cooling channel portion 80. First and second lamination group 39 and 41 may be offset relative to one another and joined as shown in FIG. 3. In an embodiment, each circumferentially extending portion 68, 70 may include a recess (not separately labeled) on an outer surface portion (also not separately labeled). The recess forms a bonding element receiving zone that may aid in joining stator 30 to inner surface 18 of housing 14.

Figure 4:
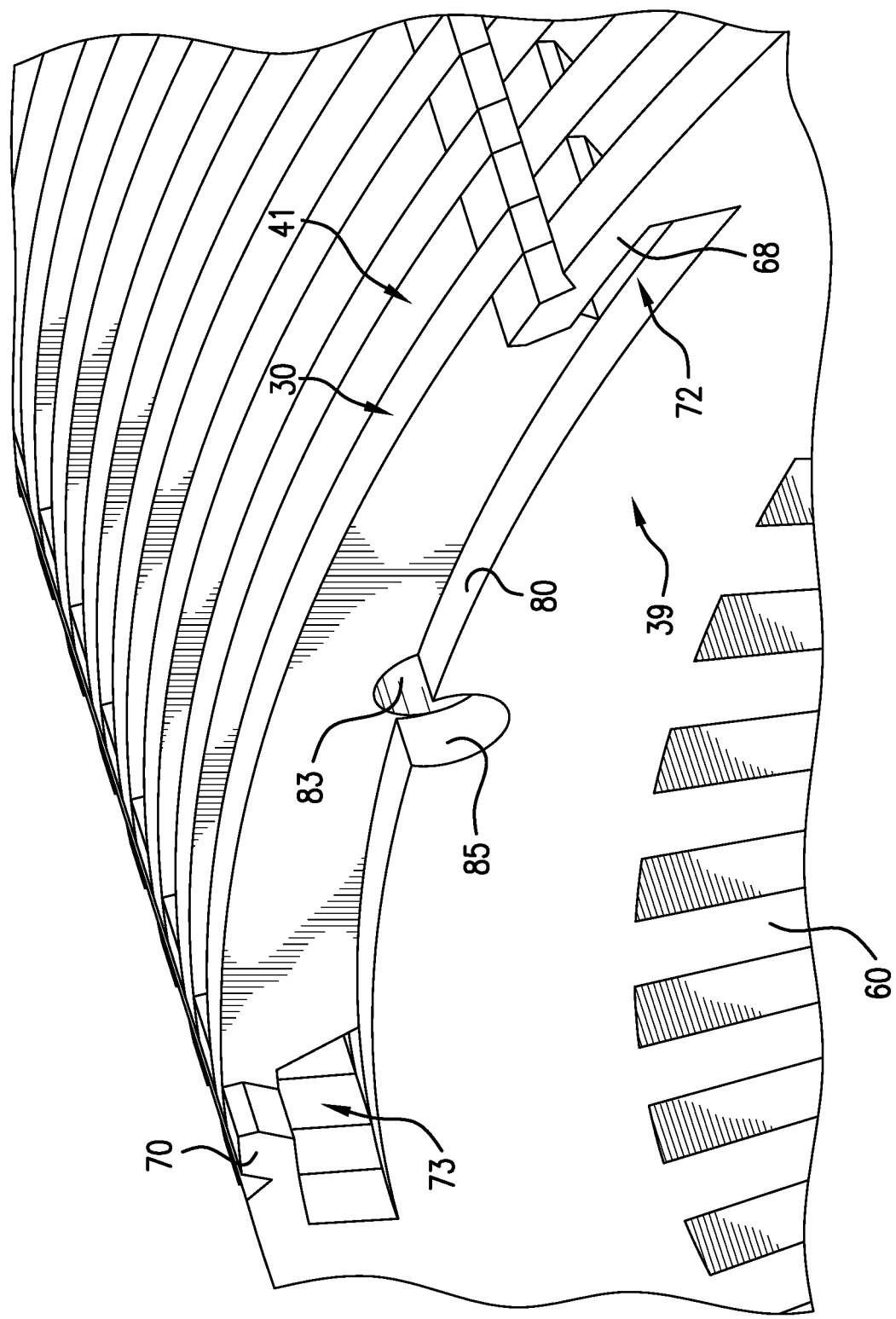
FIG. 4 depicts a serpentine coolant passage formed from a plurality of the stator lamination groups defining the stator of FIG. 1.

In an embodiment, a number of stator laminations, for example six (6) stator laminations, may be joined to form first lamination group 39. Similarly, a number of stator lamination, for example six (6) stator laminations, may be joined to form second lamination group 41. Additional lamination groups may be formed and joined together, each offset relative to another to form stator 30 such as shown in FIG. 4.

Figure 5:
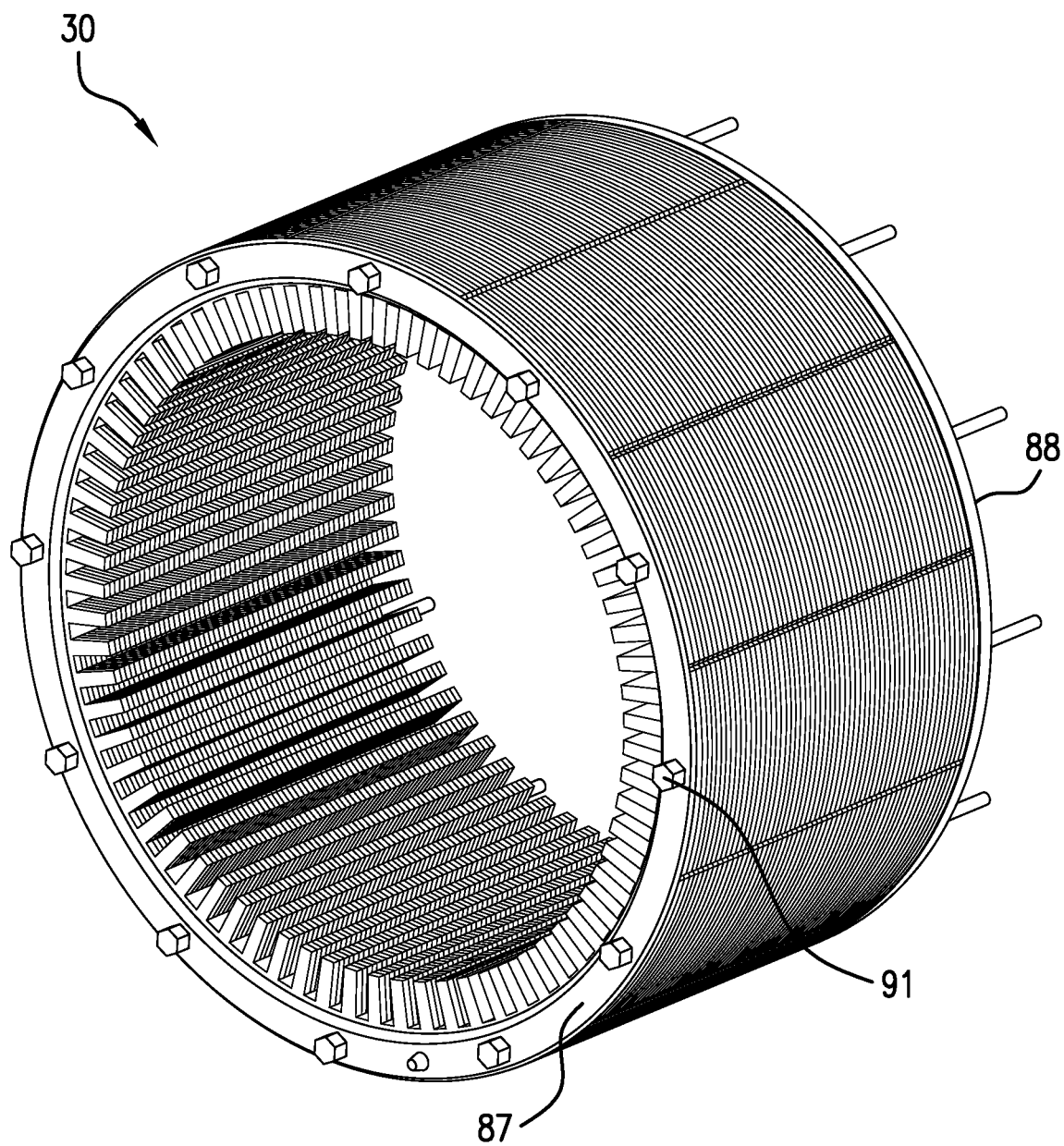
FIG. 5 depicts the stator formed from the stator laminations joined by stator end rings, in accordance with an aspect of an exemplary embodiment.

A first end ring 87 and a second end ring 88 may be installed and laminations connected through a plurality of mechanical fasteners, one of which is indicated at 91 that extend through corresponding ones of openings 83 and partial openings 85 as shown in FIG. 5. In this manner, first, second and third cooling channel portions 72, 73, and 80 may be linked to form a serpentine cooling channel (not separately labeled) that extends axially across stator 30. Cooling fluid may pass through the cooling channel between outer surface section 58 and inner surface 18 of housing 14.

At this point, it should be understood that the exemplary embodiments describe a stator that includes radially outwardly extending projections, each including circumferentially extending portions that create a tortuous or serpentine cooling channel. With this arrangement, additional surface area of the stator laminations is exposed to cooling fluid thereby enhancing heat shedding capacity. The heat shedding capacity may be increased by as much as 50% or greater compared to existing systems. Further, the increased surface area of the stator laminations provides increased flux carrying capacity of the stator that may increase performance by as much as 5%. Thus, not only does the present invention provide additional cooling but also increases an overall operational efficiency of the electric motor.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims.

What is claimed is:

1. An electric machine comprising:
    a housing having an outer surface, an inner surface, a coolant inlet, and a coolant outlet; and
    a stator mounted in the housing, the stator being formed from a plurality of stator laminations arranged in a first lamination group and a second lamination group that is circumferentially off-set from the first lamination group, the first lamination group and the second lamination group forming a tortuous flow path that extends axially across the stator, each of the plurality of stator laminations of the first lamination group and the second lamination group comprising:
    a body having an inner surface section and an outer surface section, the inner surface section including a plurality of stator teeth; and
    a plurality of cooling channel defining members integrally formed with and extending radially outwardly from the outer surface section, each of the plurality of cooling channel defining members being spaced from others of the plurality of cooling channel defining members by a corresponding gap, and
    wherein each of the plurality of cooling channel defining members includes a first circumferentially extending portion and a second circumferentially extending portion that are spaced from the outer surface section, a first circumferentially extending portion of the first lamination group overlaps a second circumferentially extending portion of the second lamination group to form at least one coolant passage.

2. The electric machine according to claim 1, wherein the first circumferentially extending portion extends in a first direction and the second circumferentially extending portion extends in a second direction, the first circumferentially extending portion being spaced from the second circumferentially extending portion.

3. The electric machine according to claim 1, further comprising: a first recess formed in an outer circumferential edge of the first circumferentially extending portion and a second recess formed in an outer circumferential edge of the second circumferentially extending portion.

4. The electric machine according to claim 1, wherein each cooling channel defining member is spaced from an adjacent cooling channel defining member by about 30°.

5. An electric machine comprising:
   a housing having an outer surface, an inner surface, a coolant inlet, and a coolant outlet; and
   a stator mounted to the inner surface of the housing, the stator including a body having an inner surface section and an outer surface section, the inner surface section including a plurality of stator teeth and a plurality of cooling channel defining members integrally formed with and extending radially outwardly of the outer surface section, the stator being formed from a plurality of stator laminations arranged in a first lamination group, and a second lamination group that is circumferentially off-set from the first lamination group, the first lamination group and the second lamination group forming a tortuous flow path that extends axially across the stator,
   wherein each of the plurality of cooling channel defining members for each of the plurality of stator laminations is spaced from each of the plurality of cooling channel defining members from others of the plurality of stator laminations,
   wherein the plurality of cooling channel defining members of the first lamination group and the plurality of cooling channel defining members of the second lamination group being arranged to form a first cooling channel portion, a second cooling channel portion, and a third cooling channel portion, the third cooling channel portion being arranged between the inner surface of the housing and the outer surface portion of the stator, the third cooling channel portion extending circumferentially between the first cooling channel portion and the second cooling channel portion and axially across the first lamination group and the second lamination group of the stator, and
   wherein each of the plurality of cooling channel defining members includes a first circumferentially extending portion and a second circumferentially extending portion that are spaced from the outer surface section.

6. The electric machine according to claim 5, further comprising: a partial opening defined in the third cooling channel portion.

7. The electric machine according to claim 6, further comprising: an opening formed in each of the plurality of cooling channel defining members, the opening being positioned to align with a partial opening in the second lamination group.

8. The electric machine according to claim 5, wherein the first circumferentially extending portion extends in a first direction and the second circumferentially extending portion extends in a second direction, the first circumferentially extending portion being spaced from the second circumferentially extending portion.

9. The electric machine according to claim 5, wherein the first cooling channel portion is defined between the outer surface section and the first circumferentially extending portion, the second cooling channel portion is defined between the outer surface section and the second circumferentially extending portion, and the third cooling channel portion is defined between the first cooling channel portion and the second cooling channel portion.

10. The electric machine according to claim 9, further comprising: a partial opening defined in the third cooling channel portion.

11. The electric machine according to claim 10, further comprising: an opening formed in each of the plurality of the cooling channel defining members, the opening being positioned to align with a partial opening in another stator lamination group.

12. The electric machine according to claim 5, further comprising: a first recess formed in an outer circumferential edge of the first circumferentially extending portion and a second recess formed in an outer circumferential edge of the second circumferentially extending portion.

13. The electric machine according to claim 5, wherein each cooling channel defining member is spaced from an adjacent cooling channel defining member by about 30°.

14. The electric machine according to claim 5, wherein the first and second cooling channel portions extend substantially axially through the plurality of stator laminations.

15. The electric machine according to claim 5, wherein the third cooling channel portion extends substantially circumferentially around the plurality of stator laminations.

16. The electric machine according to claim 5, wherein the stator is mounted to the inner surface of the housing, the third cooling channel portion being defined between the outer surface section of the stator and the inner surface of the housing.

* * * * *